Feb. 15, 1966 L. C. CONNER 3,235,308
ADJUSTABLE SEAT APPARATUS
Filed July 27, 1964
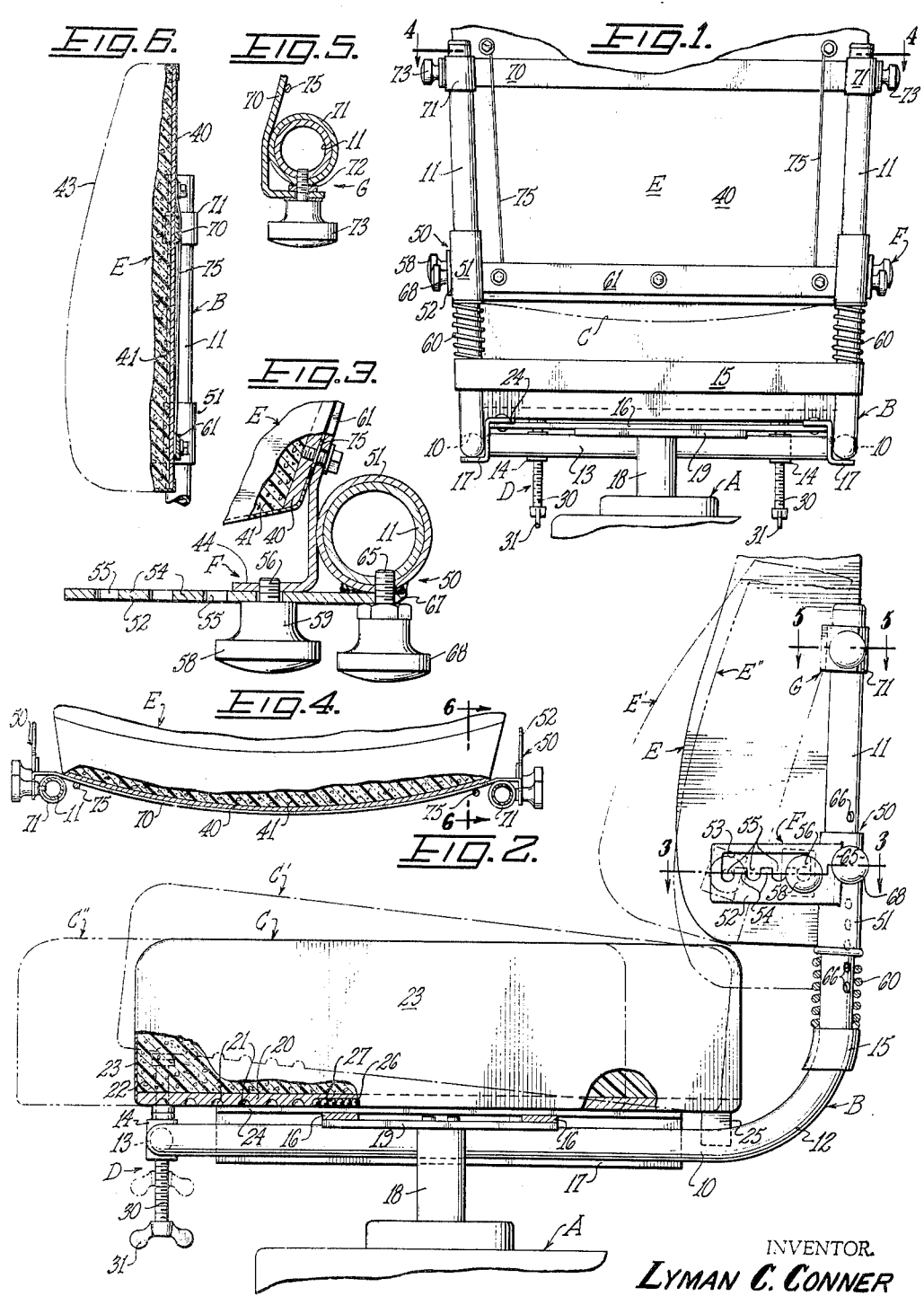
INVENTOR.
LYMAN C. CONNER
BY
Lynn Latta
ATTORNEY United States Patent Office 3,235,308
Patented Feb. 15, 1966

3,235,308
ADJUSTABLE SEAT APPARATUS
Lyman Clark Conner, Los Angeles, Calif., assignor to Flexible-Air Seat Corporation, Los Angeles, Calif., a corporation of California
Filed July 27, 1964, Ser. No. 385,215
16 Claims. (Cl. 297—337)

This invention relates to seats and is particularly directed to improvements in a driver's seat for long-distance vehicles such as cross-country trucks and buses operated by drivers who must occupy the seat during frequently-recurring long periods of time. The general object of the invention is to reduce driver fatigue by improved adjustments of seat cushions to fit the anatomical contours of drivers of varying sizes and proportions. The invention is aimed especially at the elimination of "pressure points" of contact between the driver's body and the seat cushions, which are the causes of discomfort and fatigue. More particularly the invention aims to relieve all "pressure points" by providing soft, firm cushioning support which is distributed over the bottom and back areas of supporting contact between the seat and the driver's body.

Toward the attainment of the foregoing objects, the invention provides a combination of seat cushion and back cushion and adjustable supporting apparatus therefor:

(1) Providing an improved combination of elevational adjustment and tilting adjustment of the back cushion relative to the seat cushion;

(2) Providing fore-aft adjustment and tilting adjustment of the seat cushion relative to the back cushions;

(3) Enabling the driver to adjust either or both of the cushions while occupying the seat and without stopping the travel of the vehicle being driven;

(4) Providing a spring-loaded means for balancing the weight of the back cushion to facilitate elevational adjustment thereof;

(5) Providing for vertical adjustment of a transverse back support bar which transmits support from the frame to the back cushion so as to adjust the "pressure point" of back support to a position of maximum comfort for a particular driver;

(6) Providing a relatively simple but effective vertically slidably connection between the back cushion and such transverse back support bar;

(7) Providing for length and height adjustment of the seat cushion, and also for adjusting the distribution of pressure under the legs of a driver.

(8) To provide a seat of maximum comfort adaptable for use by drivers of trucks, buses, road machines, excavating machines and all types of heavy road vehicles; and also adaptable to other types of uses such as in furniture etc.

Other objects and advantages will become apparent in the ensuing specification and appended drawing in which:

FIG. 1 is a rear elevational view of the frame structure of a seat embodying my invention;

FIG. 2 is a fragmentary side elevational view of the seat;

FIG. 3 is a horizontal sectional view taken on the line 3—3 of FIG. 2;

FIG. 4 is a horizontal sectional view taken on the line 4—4 of FIG. 1;

FIG. 5 is a detail horizontal sectional-plan view taken on the line 5—5 of FIG. 2; and FIG. 6 is a vertical sectional-elevational view taken on the line 6—6 of FIG. 4.

Referring now to the drawing in detail, I have shown therein as an example of one form in which the invention may be embodied, a seat comprising, in general, a cushioning pedestal support A; an L-shaped frame structure B mounted on the cushioning pedestal support A; a set cushion unit C mounted on the base portion of frame B; adjustable front support means D providing for tilting and fore-aft adjustment of seat cushion C; a back cushion E; a combined tilting and elevational adjustment means F providing an adjustable supporting connection between the lower extremity of back cushion E and frame B; and a transverse fulcrum bar unit G against which the upper portion of the back cushion E is fulcrumed in any selected position of adjustment of the back cushion.

The adjustable supporting means F provides for fore-aft adjustment of the lower portion of the back cushion E and also provides for vertical adjustment which is effected by sliding the mechanism F vertically on the back part of frame structure B. During such adjustments, the upper portion of the back cushion E is fulcrumed against the fulcrum bar unit G while being freely slidable in relation thereto to accommodate the adjustments effected between the lower end of the cushion and the frame B. The adjustment means D provides a supporting connection between the forward part of the seat cushion C and the frame B providing for the fore-aft adjustment and the vertical adjustment tilting, and at the same time positioning the cushion against any horizontal displacement from a selected position, while the rear portion of the cushion is freely slidable on the frame B.

Cushioning pedestal support A may be generally of the pneumatic type disclosed in my pending application Serial No. 374,572, filed June 12, 1964, although not essential to the invention. The details thereof form no part of the present invention.

Seat frame B comprises a pair of L-shaped side members (FIG. 2) of metal bar or tube material, each comprising a horizontal seat rail 10 and an upright back post 11 integrally joined by a bend 12. The forward ends of seat rails 10 are connected by a forward bridge bar 13 (FIG. 1) having thereon laterally spaced, internally threaded bosses 14 constituting parts of the seat cushion adjusting apparatus D. The upper ends of posts 11 are bridged and embraced in spaced relation by the back support bar unit G. Just above the bends 12, a lower cross bar 15 is secured by any suitable means (e.g. by welding) to the respective back posts 11. Seat rails 10 are bridged by a pair of cross bars 16 having ends suitably secured thereto as by means of longitudinally extending Z brackets 17. Frame B is mounted upon a vertically slidable plunger 18 by means of a bridge plate 19 having respective ends extending beneath and supporting the central portions of cross bars 16, plunger 18 and plate 19 constituting parts of the pedestal-type cushioning unit A. The cross bars 16 and bridge plate 19 cooperatively constitute a platform the center of which is supported by the plunger 18 and the side marginal portions of which are in supporting relation to the seat rails 10.

Seat cushion C comprises a bottom panel 20 having in its under face, along respective side margins thereof, a plurality of downwardly opening sockets 21. Mounted upon the bottom panel 20 is a cushion body 22 of foam rubber or equivalent cushioning material having a conventional cover 23 of fabric, sheet plastic or other suitable seat cover material. Length and height adjustment of the seat cushion and adjustment of the distribution of pressure under the legs of a driver, are accomplished by providing variable density in the cushion, ranging from firm at the rear and along the sides to relatively soft along the front margin, for adjusting and relieving excess pressure at the pressure points under the legs. This is important in avoiding restriction of circulation of blood in the driver's legs. The side marginal portions of bottom panel 20 rest upon the upper flanges 24 of the longitudinal Z-brackets 17 and upon the adjustable front support means D. Guide fingers 25 are secured to the rear corners of bottom panel 20 and project downwardly in slidingly embracing relation to seat rails 10, for lateral positioning of the cushion at its rear end. In the fore-aft adjustment of the seat cushion C previously referred to, the rear end portion of the cushion will slide freely upon the Z-brackets 17 while being positioned against any lateral displacement, the positioning being effected by the two-point connection of the forward end of the cushion to the adjustable support mechanism D which will now be described. To facilitate such sliding movement, ball bearings 26 are interposed between the flanges 24 and linear bearing races 27 in the lateral marginal portions of bottom panel 20, and are retained by suitable straight-line bearing retainers (which can be of conventional construction and therefore are not shown) in association with panel 20.

Adjustable support mechanism D comprises a pair of screw-jack shafts 30 threaded upwardly through the bosses 14 on the front cross bar 13 of frame B and having at their upper ends ball tips which are engaged selectively in a pair of laterally opposed sockets 21 of the seat bottom panel 20. Suitable handles or knobs 31 on the lower ends of screw shafts 30 may be grasped for manually rotating the screw shafts 30 so as to vary the elevation of the forward end of the seat cushion C (e.g. from the lowered position shown in full lines to the upwardly tilted position shown in phantom at C' in FIG. 2). In such upwardly tilted position, the rear corner areas of the seat bottom panel 20 will rest against the rear extremities of top flanges 24 of Z-brackets 17 to support the rear end of the seat cushion. For fore-aft shifting movement, the cushion C will normally be in the lowered position shown in full lines in FIG. 2. Cushion C may be of bucket shape as indicated in phantom in FIG. 1.

The cushion C can be bodily shifted to selected positions of fore-aft adjustment within a range determined by the number of sockets 21 in each of the lateral rows of sockets. For example, the cushion can be shifted forwardly from the position shown in full lines in FIG. 2 to the position shown in phantom at C", sufficiently forwardly to provide a gap in which the lower end of cushion E can be received in a lower limit poistion of adjustment of that cushion as indicated at E" in FIG. 2. In all positions of adjustment of cushion C, the engagement of the tips of screw shafts 30 in a pair of laterally opposed sockets 21 of seat bottom panel 20, with the cooperation of the guide fingers 25 at the rear corners of the cushion, will effectively position the seat C against any displacement from its selected position either in a fore-aft direction or laterally. This positioning will be effective to prevent lateral displacement either at the front or the rear end of the seat cushion, and will effectively maintain the rear end of the cushion resting in full supporting contact with the rear ends of both Z-bracket flanges 24.

Back cushion E comprises a suitable back panel 40 which can be of formed sheet metal or other suitably stiff material to provide for retaining retention of a cushioning body 41 of sponge rubber or equivalent cushioning material attached to the forward side thereof. Preferably it is of bucket shape, with its forward surface concaved as shown in FIG. 4 and with its vertical configuration bulged forwardly as at 42 (FIG. 6) with a convex curvature in its lower portion and with its upper portion having a reversed concave curvature as at 43, the convex lower portion 42 conforming to the contour of the small of the driver's back and the concave curvature 43 conforming to the forward curvature of the back near the shoulders. One of the important functions of the invention is to provide for vertical adjustment of the seat back E to correspond to variations in the height and configuration of a driver's back as between drivers of varying sizes and proportions. To this end, the back cushion E is attached to the back posts 11 of frame B by the vertically adjustable mechanism F now to be described.

Adjustable back support mechanism F comprises a pair of bracket units 50 each embodying a sleeve 51 which is vertically adjustable on a respective vertical arm 11 of frame B, and a rack arm 52 integral with and projecting forwardly from sleeve 51. In each rack arm 52 is a longitudinal slot 53 having a straight upper margin and a lower margin defined by a plurality of upwardly projecting teeth 54 separated by notches 55. The arms 52 are in closely embracing relation to the lower end of back cushion E, and are attached to the respective sides thereof by clamp screws 56 threaded into the tabs 44 of the seat back panel 40. Each clamp screw 56 has a shank portion adapted to be snugly seated in a selected one of the notches 55 to determine a selected position of forward tilt of the lower portion of back cushion E; and has a knob or handle 58 with an abutment shoulder 59 adapted to be clamped against the outer face of a respective rack arm 52 and to clamp the latter against the respective tab 44 to securely lock the back cushion E to the respective arm 52 in the selected position of adjustment. The range of adjustment extends from a rearward limit position shown in full lines in FIG. 2 (determined by engagement of screws 56 in the rearmost notches 55) and a forward limited of adjustment shown in phantom at C" in FIG. 2 (determined by engagement of screws 56 in the most forward notches 55).

Sleeves 51 are connected by a bridge bar 61 and are supported upon coil springs 60 coiled around the vertical arms 11 with their lower ends supported upon the respective ends of lower cross bar 15 of frame B. Bridge bar 61 has, at its respective ends, tabs 44 (FIG. 3) for connection to back adjustment mechanism F, tabs 44 being formed as integral end portions of bar 61, bent forwardly therefrom. Being somewhat compressed by the weight of the seat back imposed upon them, coil springs 60 function to largely counterbalance such weight so that the driver may readily raise and lower the seat back with a minimum of effort.

Positions of vertical adjustment of the back cushion E are determined by engagement of the tips of locking screws 65 (FIG. 3) in vertical rows of apertures 66 in the respective vertical arms 11 of frame B. The height is determined by the selection of a pair of apertures into which the locking screws 65 are inserted. To this end, the screws 65 are threaded through bosses 67 on the slide bearing sleeves 51 and are manipulated by suitable knobs 68 which are grasped in the hands of the driver. This can be done by reaching rearwardly while he is seated in the seat. By backing off the locking screws 65 their tips can be withdrawn from one pair of aperture 66, the back cushion E then adjusted to the selected height and the tips of the locking screws then advanced into the newly selected pair of apertures.

The upper portion of the back cushion E is rested against the transverse upper support bar G comprising a bar 70 of strap metal and a pair of collars 71 to which the ends of the bar 70 are suitably secured as by welding as at 72. The collars 71 slidably mounted on the upper ends of vertical frame arms 11, and are adapted to be secured thereto in selected positions of vertical adjustment by means of clamp screws 73.

The cross bars 15, 61 and 70 are rearwardly bowed as shown in FIG. 4 to conform to the transverse bucket curvature of back cushion E. The vertical position of supporting contact of upper support bar 70 against the back of cushion E is a factor in determining the angle of tilt to which the back cushion E is adjusted by fore-aft adjustment of its lower end through the adjustable connection F. In this connection it may be noted that in the tilting adjustment of the back cushion it will fulcrum against the fulcrum bar 70. As the height of the bar 70 above the adjustable connection F is increased, the extent of tilt imparted to the back cushion by any selected number of notches of fore-aft adjustment of the lower end of the cushion, will be decreased.

The upper portion of the back cushion E is loosely tied to the fulcrum bar 70 by a pair of tie wires 75 the lower ends of which are secured to the bridge bar 61 and thus to the lower corners of cushion E. The upper ends of tie wires 75 are secured to the upper corners of the back panel 40. The tie wires 75 extend behind the fulcrum bar 70 as shown in FIGS. 1 and 6, to retain this bar in slidable contact with back panel 40, while avoiding any interference with the forward tilting of the lower end of the cushion E. It may now be noted that as the cushion E is adjusted vertically, the fulcrum bar 70 will be relatively slidable between the tie wire elements 75 and the back panel 40 of the cushion E. A tilted position of back cushion E in which its lower end is adjusted forwardly is shown in phantom at E′ in FIG. 2. A downwardly shifted position in which its lower end is projected below the top level of seat cushion C (when the latter is projected forwardly to provide a gap between its rear end and the posts 11) is shown in phantom at E″.

In all vertically shifting and tilting adjustments of seat cushion E, its upper portion is free to slide against and fulcrum around the supporting fulcrum bar G while being tied to such bar by the tie wire elements 75 which does not interfere with such free sliding and tilting movements.

The fore-aft adjustment of seat cushion C can be combined with vertical tilting adjustments thereof in any selected combination. The fore-aft adjustment accommodates the seat cushion to varying leg length (from hip to knee) of different drivers. The vertical tilting adjustment may be used to accommodate the seat cushion to varying lower leg lengths. The tilting adjustment of the back cushion may be utilized to match tilting adjustments of the seat cushion and to assist in conforming the vertical contour of the back cushion to the vertical contour of the driver's back. The bodily vertical adjustment of back cushion E may be utilized to accommodate this cushion to the height of the driver's back and to shift the "pressure point" between the cushion and the driver's back to a position where maximum support and comfort is provided, to the end that fatigue may be minimized.

Vertical adjustments of seat cushion C at its front end can be utilized to increase supporting engagement of the forward portion of the cushion beneath the driver's thighs and thereby to relieve pressure under his hips. Forward adjustment of the seat cushion can likewise be utilized to shift the supporting engagement forwardly beneath the thighs.

While especially advantageous for truck and bus drivers, the invention is likewise applicable to seats for vehicles of all kinds, including automobiles, rail vehicles, road-working and excavation machines, aircraft, and other vehicles.

I claim:

1. Seat structure comprising, in combination: a frame having a pair of laterally spaced upright back posts; a horizontal fulcrum bar bridging between said posts; a pair of brackets including means mounted on the respective posts for vertical adjustment and arms projecting forwardly from said mounted means; and a back cushion having an upper portion thereof resting against said fulcrum bar and having, at respective sides of its lower portion, means cooperating with said arms to support said back cushion on said arms at selected positions of fore-aft adjustment of said lower portion whereby to adjust said back cushion to selected positions; said cushion being freely slidable vertically with reference to said fulcrum bar during vertical adjustment of said brackets on said posts; said fulcrum bar being provided at its respective ends with collars encircling the respective posts and vertically slidable thereon; and manually operable means for locking said collars to the respective posts to provide selective positions of vertical adjustment of said fulcrum bar upon said posts so as to vary the height of fulcrum support of said back cushion.

2. Seat structure as defined in claim 1, including means to secure said brackets to said posts in selected positions of vertical adjustment of said back cushion.

3. Seat structure as defined in claim 1, including a tie element having respective upper and lower ends secured to the rear face of said back cushion, said fulcrum bar extending transversely between said tie element and said rear face and said tie element tying the back cushion to said fulcrum bar while permitting said free sliding adjustment of the cushion relative to said fulcrum bar.

4. Seat structure as defined in claim 1, including a seat cushion mounted on said frame for fore-aft adjustment with relation to said back cushion over a range of adjustment such that in a forward position thereof there is provided a gap between the rear end of said cushion and said posts of sufficient width to receive the lower portion of said back cushion in a lower limit position of adjustment of the latter.

5. Seat structure as defined in claim 1, including a seat cushion mounted on said frame for fore-aft tilting adjustment with relation to said back cushion.

6. Seat structure comprising, in combination: a frame having a pair of laterally spaced upright back posts; a pair of brackets including respective sleeves slidably mounted on the respective back posts and support arms projecting forwardly from the respective sleeves; means carried by the respective sleeves and engageable with the respective posts to secure said brackets to said posts in selected positions of vertical adjustment; a back cushion; attachment means on respective sides of the lower portion of said cushion engageable with the respective bracket arms at selected positions of fore-aft adjustment along said arms to support said lower end of the cushion on said arms in selected positions of tilted inclination; and a fulcrum bar supported by and extending between said posts above said brackets, said fulcrum bar extending transversely behind and in contact with said back cushion to provide a fulcrum against which an upper portion of said back cushion is supported while being free for vertically slidable and tilting movements in response to vertical adjustments of said brackets and fore-aft adjustments of the points of support of said lower end of the cushion upon said bracket arms.

7. Seat structure as defined in claim 6, wherein each of said bracket arms is provided with a longitudinally extending array of retainer notches; and wherein said attachment means comprises studs attached to and projecting laterally from said lower portion of the cushion and engageable selectively in pairs of laterally opposed notches of said arrays to provide said selective positions of fore-aft adjustment of the lower portion of said cushion.

8. Seat structure as defined in claim 7, wherein said studs are embodied in clamp screws threaded into respective sides of said back cushion and operable to clamp said arms against the respective sides of said cushion to lock the cushion to the arms in any selected position of tilted adjustment of the cushion.

9. Seat structure as defined in claim 8, wherein each of said bracket arms is provided with a longitudinally extending slot through which said clamp screws extend, and includes a plurality of upwardly projecting teeth separating said retainer notches and cooperating therewith to define the lower side of said slot.

10. Seat structure as defined in claim 6, including coil springs coiled about the respective posts with their lower ends supported by the posts and their upper ends providing yielding lift against said brackets to carry at least a portion of the weight of said back cushion during vertical adjustment thereof so as to facilitate such vertical adjustment.

11. Seat structure comprising, in combination: a frame comprising a pair of laterally spaced L-shape frame members embodying respective fore-aft seat rails and upright back posts extending upwardly from the rear extremities of said rails; a pair of brackets including respective sleeves slidably mounted on the respective back posts and support arms projecting forwardly from the respective sleeves; means carried by the respective sleeves and engageable with the respective posts to secure said brackets to said posts in selected positions of vertical adjustment; a back cushion; attachment means on respective sides of the lower portion of said cushion engageable with the respective bracket arms at selected positions of fore-aft adjustment along said arms to support said lower end of the cushion on said arms in selected positions of tilted inclination; and a fulcrum bar supported by and extending between said posts above said brackets, said fulcrum bar extending transversely behind and in contact with said back cushion to provide a fulcrum against which an upper portion of said back cushion is supported while being free for vertically slidable and tilting movements in response to vertical adjustments of said brackets and fore-aft adjustments of the points of support of said lower end of the cushion upon said bracket arms.

12. Seat structure as defined in claim 11, including a seat cushion mounted on said seat rails for fore-aft shifting adjustment and for vertical adjustment of its forward end to effect tilting adjustment thereof.

13. Seat structure as defined in claim 12, wherein said frame includes a forward cross member bridging between the forward ends of said seat rails, and wherein the means for effecting said adjustments of the seat cushion comprises a pair of studs mounted and adjustable vertically in said cross member, and means in the bottom of said seat cushion providing a pair of laterally spaced fore-aft rows of sockets in which the upper ends of the respective studs are respectively receivable to provide for said fore-aft shifting adjustment, said studs being vertically adjustable in said cross member to effect said tilting adjustment.

14. Seat apparatus as defined in claim 13, wherein said studs are in the form of screws and said cross member is provided with internally threaded bosses through which said screws are threaded to effect said vertical adjustment of said studs.

15. Apparatus as defined in claim 14, including means carried by the respective seat rails providing free-slidable bearing support for the rear end portion of said seat cushion in response to fore-aft and vertical adjustments of the forward end thereof.

16. Apparatus as defined in claim 15, wherein said sliding bearing support means comprises a pair of Z-section bars extending along the inner sides of said seat rails, having bottom flanges extending beneath and in supporting engagement with said seat rails and top flanges projecting toward one another between said seat rails; platform means extending between said top flanges and having side marginal portions supporting the same; and a shock-absorbing pedestal support including a vertically movable plunger having its upper end in supporting engagement and attachment to the underside of said platform means.

References Cited by the Examiner

UNITED STATES PATENTS

| | | | |
|---|---|---|---|
| 1,621,520 | 3/1927 | Snyder | 297—345 |
| 1,922,418 | 8/1933 | Conant | 297—345 |
| 2,855,026 | 10/1958 | Simons | 297—355 |
| 2,988,398 | 6/1961 | Hamilton | 297—353 |
| 3,090,647 | 5/1963 | Moore | 297—307 |
| 3,144,270 | 8/1964 | Bilancia | 297—337 |

FOREIGN PATENTS 838,665   6/1960   Great Britain.

FRANK B. SHERRY, *Primary Examiner.*

F. K. ZUGEL, *Assistant Examiner.*